United States Patent [19]
Hosoi

[11] Patent Number: 5,897,242
[45] Date of Patent: Apr. 27, 1999

[54] METHOD OF CONTROLLING HEATER FOR USE IN A FACSIMILE MACHINE

[75] Inventor: Hideaki Hosoi, Tokyo, Japan

[73] Assignee: Oki Data Corporation, Tokyo, Japan

[21] Appl. No.: 09/049,473

[22] Filed: Mar. 27, 1998

[30]      Foreign Application Priority Data

Apr. 2, 1997  [JP]  Japan .................................. 9-083704

[51] Int. Cl.⁶ ................................................ G03G 15/20
[52] U.S. Cl. ........................................... 399/70; 358/400
[58] Field of Search .................................. 399/10, 69, 70, 399/320, 330, 328; 219/216; 358/438, 300, 400

[56]             References Cited

U.S. PATENT DOCUMENTS

| 5,063,459 | 11/1991 | Nakatani et al. ........................ 358/404 |
| 5,068,675 | 11/1991 | Momose .................................. 347/212 |
| 5,453,824 | 9/1995  | Vegeais .................................. 399/69 |
| 5,483,353 | 1/1996  | Kudou .................................... 358/404 |
| 5,694,226 | 12/1997 | Yokoyama ............................... 358/468 |

FOREIGN PATENT DOCUMENTS

| 07-007574 | 1/1995  | Japan . |
| 07-154559 | 6/1995  | Japan . |
| 07-212553 | 8/1995  | Japan . |
| 06-100751 | 10/1995 | Japan . |

*Primary Examiner*—Robert Beatty
*Attorney, Agent, or Firm*—Rabin & Champagne P.C.

[57]             ABSTRACT

A temperature controlling method is used to control a temperature of a heat roller for a fixing unit for use in a facsimile machine. A print engine prints a transmission report after information has been transmitted to a receiving end. An electric power is supplied to a heater in the heat roller concurrently with transmission of information to a receiving end so as to increase the temperature of the heat roller to a preheat temperature Tp. The heat roller is then maintained at the preheat temperature Tp during the transmission of the information to the receiving end. After the transmission of the information has been completed, the temperature of the heat roller is increased from the preheat temperature Tp to a fixing temperature Tf.

2 Claims, 7 Drawing Sheets

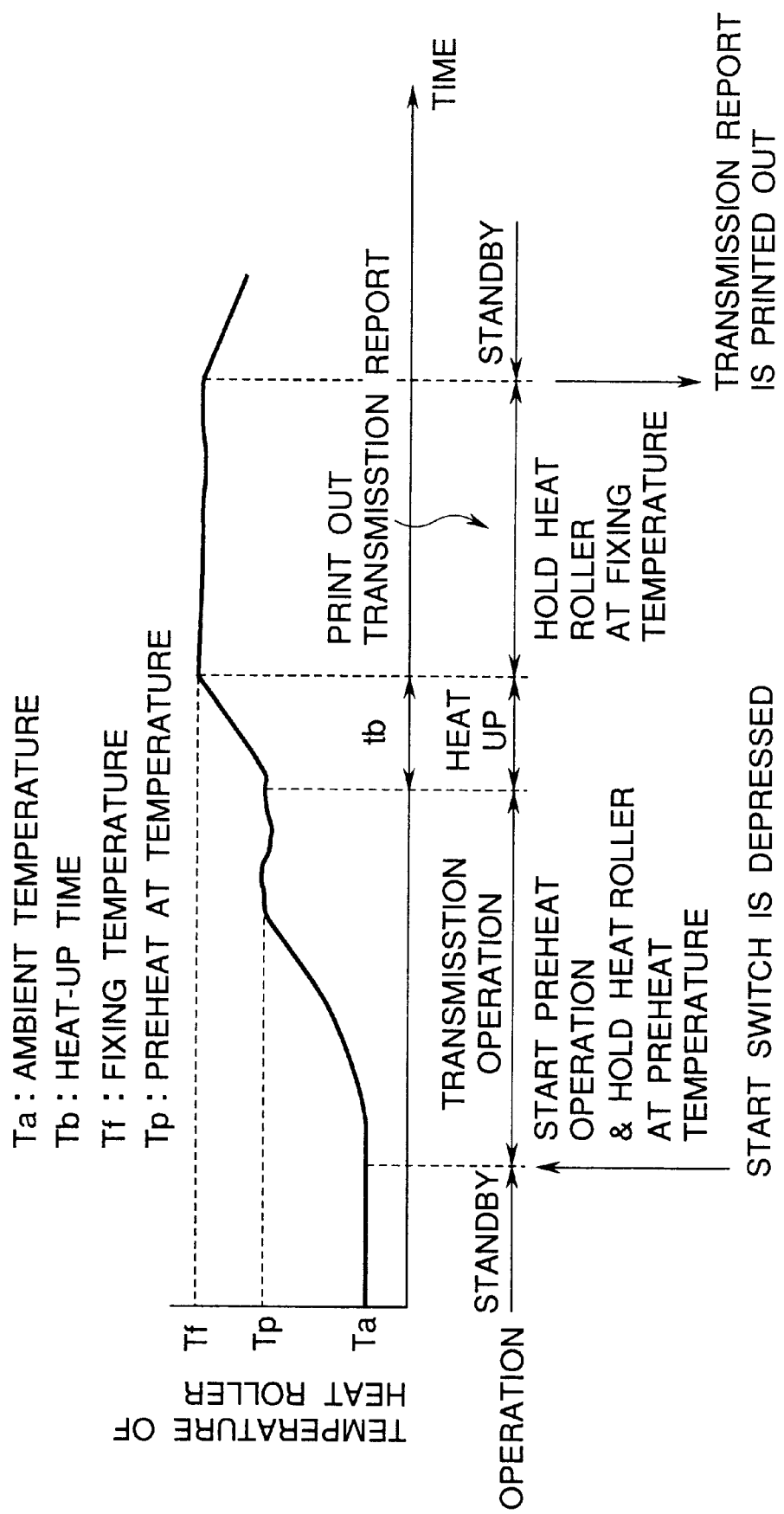

METHOD OF CONTROLLING HEATER FOR USE IN A FACSIMILE MACHINE

BACKGROUND OF THE INVENTION

1. Field of the Invention

The present invention relates to a method of controlling the temperature of a heater of a fixing unit for use in an electrophotographic printer type facsimile machine.

2. Description of Related Art

Some facsimile machines are designed to print out a transmission report after the transmission is over, thereby outputting information reporting on the facsimile transmission to the user.

Such information includes date of facsimile transmission, time length for transmission, ID number or telephone number of the receiving end, the total number of transmitted pages, and transmission results (e.g., Safely transmitted/ Transmission failed/Busy line/Error pages).

The transmission report is not necessarily printed out when the transmission is over. The printing out of the transmission is usually set "ON" or "OFF" by the user before each transmission. Some facsimile machines retain the "ON" state until the transmission report is reset by the user, once the printing of the transmission report is set "ON".

Some facsimile machines are equipped with an electrophotographic printer as a print engine where a toner image formed on the surface of a photoconductive drum is transferred onto a print medium by a transfer roller. The print medium is then advanced to the fixing unit where the toner image is fused. The fixing unit includes a pair of heat rollers. One of the pair of heat rollers has a heater therein. A thermistor is located in proximity to the heat roller having the heater built therein and detects the temperature of the heat roller. When the print medium passes between the pair of heat rollers, the toner image is fused with the heat and pressure applied by the heat rollers.

No printing operation is performed during periods such as a standby period and a transmission period. The heater is switched off during the standby period and transmission period, thereby saving electric power.

The related art will be described with respect to a facsimile machine incorporating an electrophotography type printer.

Prior to sending a facsimile, the user inputs a command as to whether or not a transmission report should be printed and subsequently depresses a START switch. Upon depressing the START switch, the facsimile machine activates a transmitting operation for transmitting the information to the receiving end.

After the transmission is over, a check is made to determine whether TRANSMISSION REPORT has been set ON. If it is determined that TRANSMISSION REPORT has not been set ON, then the facsimile machine does not print out the transmission report, and the facsimile machine enters the standby state where the machine waits till the next transmission operation is activated.

If it is determined that the printing of the transmission report has been set ON, the heater is energized to heat the heat roller to a fixing temperature Tf. The thermistor detects the temperature of the heat roller. When the outputs of the thermistor reaches a predetermined value or fixing temperature Tf, the transmission report is printed out. Then, the print medium is ejected, and the printing operation of the transmission is over.

With the aforementioned conventional facsimile machine, if the TRANSMISSION REPORT has been set ON, the heater is supplied with electric power after the transmission of information is over. As soon as the heat roller reaches the fixing temperature Tf, the printing operation starts to print out the transmission report.

For example, if the fixing temperature Tf is 155° C., it takes about 17 seconds for the heat roller to reach 155° C. when an ambient temperature Ta is 25° C. In other words, the printing operation of the transmission report starts 17 seconds after the facsimile has been sent to the receiving end.

The time period from the activation of transmission till the transmission report has been printed out is the sum of the time for sending information to the receiving end, the time for heating up the heat rollers, and the time for printing the transmission report. The total time required is too long.

SUMMARY OF THE INVENTION

A temperature controlling method is used to control a temperature of a heat roller for a fixing unit for use in a facsimile machine in which a print engine prints a transmission report after information has been transmitted to a receiving end. An electric power is supplied to a heater in the heat roller concurrently with transmission of information to a receiving end so as to increase a temperature of the heat roller to a preheat temperature Tp. The heat roller is then maintained at the preheat temperature Tp during the transmission of the information to the receiving end. After the transmission of the information has been completed, the temperature of the heat roller is increased from the preheat temperature Tp to a fixing temperature Tf and the transmission report is printed out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a sequence chart of the invention.

DESCRIPTION OF THE INVENTION

A preferred embodiment of the present invention will be described in detail with reference to the accompanying drawings.

Figure 1:
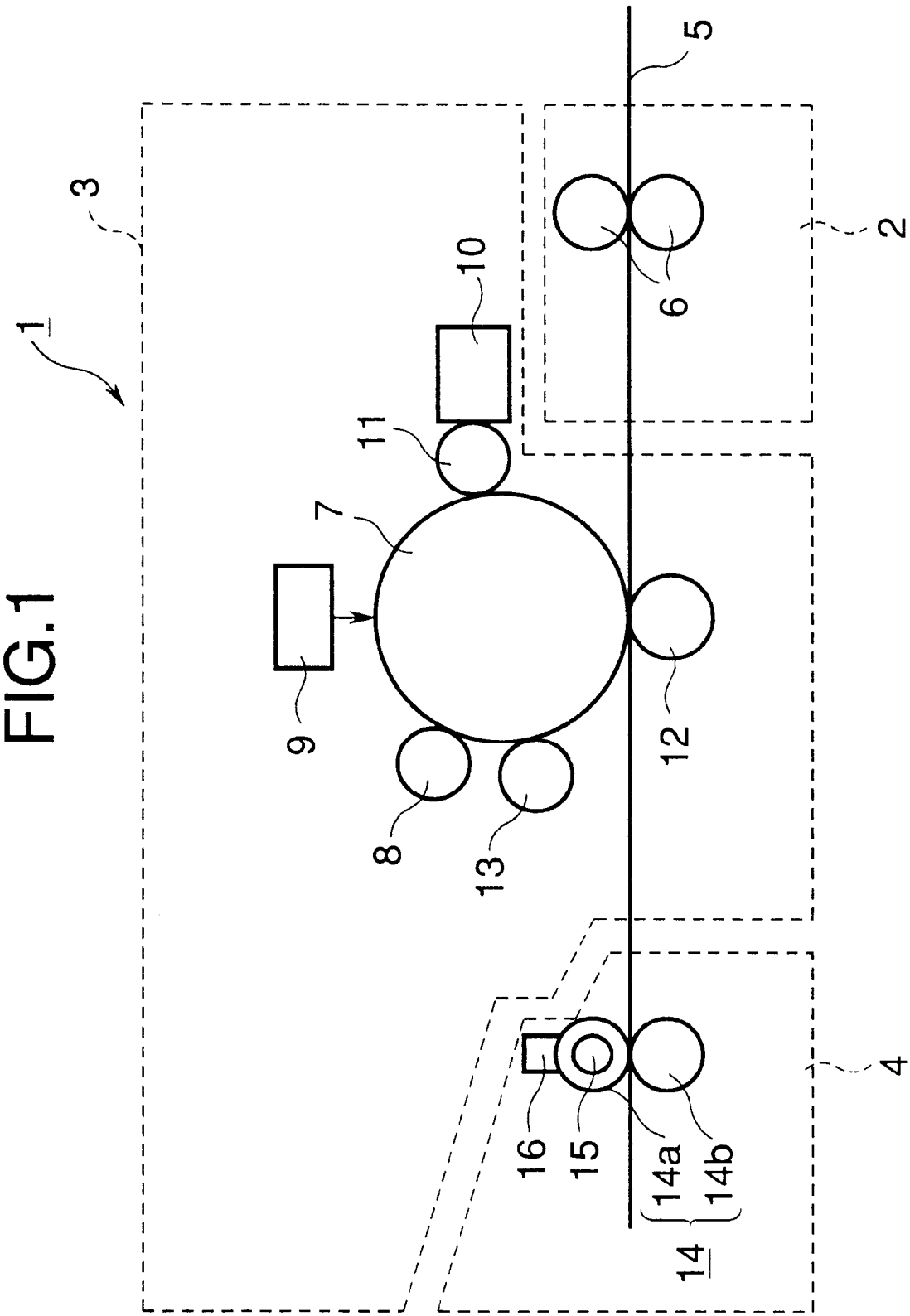
FIG. 1 illustrates a general construction of a print engine of a facsimile machine according to the the invention.
Figure 2:
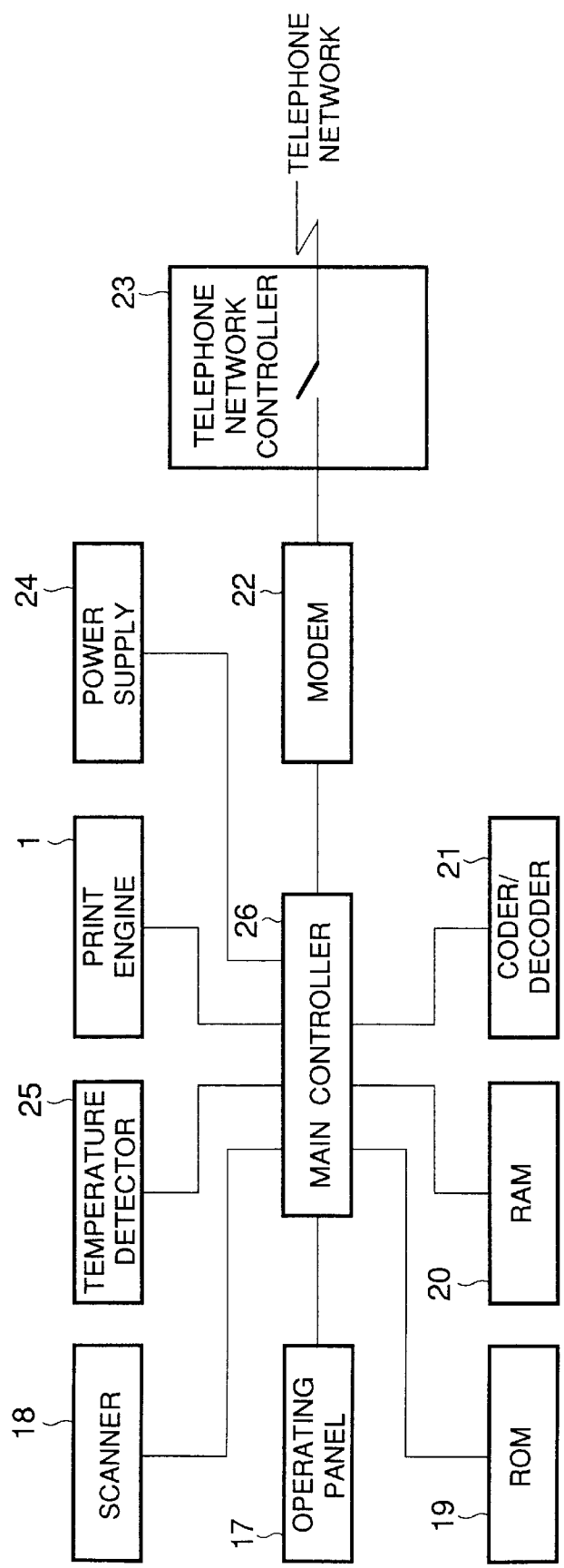
FIG. 2 is a block diagram illustrating a control system for the facsimile machine of the invention.

FIG. 1 illustrates a general construction of a print engine of a facsimile machine according to the preferred embodiment. FIG. 2 is a block diagram illustrating a control system for the facsimile machine.

The construction of the facsimile machine will be described. The facsimile machine incorporates an electrophotography type print engine 1.

Referring to FIG. 1, the print engine 1 includes a medium transporting section 2, toner image forming section 3, and fixing section 4. The medium transporting section 2 includes a pair of feed rollers 6 which transport the print medium 5 therebetween.

Toner image forming section 3 forms a toner image on the print medium 5. Disposed around a photoconductive drum 7 are a charging roller 8, head 9, developing roller 11, transfer roller 12, and cleaning roller 13. The charging roller 8 supplies static charges to the photoconductive drum 7. The head 9 has a plurality of light-emitting diodes that illuminates the surface of the photoconductive drum 7 or a laser beam that scans the surface of the photoconductive drum 7. The developing roller 11 charges toner supplied from a toner cartridge 10 and applies the charged toner to the electrostatic latent image on the photoconductive drum 7 so that the latent image is developed into a toner image. The transfer roller 12 is given charges of a polarity opposite to the charged toner, and receives a predetermined pressure so that the print medium 5 is in sufficiently intimate contact with the photoconductive drum 7, thereby transferring the toner image to the print medium 5 with the aid of Coulomb force.

The cleaning roller 13 receives a bias voltage of a polarity opposite to the charges of the toner and attracts residual toner which is left on the photoconductive drum 7 after the toner image has been transferred to the print medium 5. The cleaning roller 13 also neutralizes the surface of the photoconductive drum 7.

The toner image is then fused by the fixing section 4. The fixing section 4 includes a pair of heat rollers 14a and 14b. One 14a of the heat rollers has a heater 15 incorporated therein. There is provided a thermistor 16 in proximity to the heat roller 14a. The thermistor 16 detects the temperature of the heat roller 14a. The heat rollers 14a and 14b pull the print medium 5 therebetween and the toner image on the print medium 5 is fused by the heat and pressure applied by the heat rollers 14a and 14b.

The control system of the facsimile will now be described.

Referring to FIG. 2, the user input commands into the facsimile machine by operating the keys on the operating panel 17. A scanner 18 optically reads the information on the original. The print engine 1 prints image data received from a sending end and the transmission report. A ROM 19 stores programs that control the overall operation of the facsimile machine. A RAM 20 stores the received data, data to be transmitted, and default settings for various functions.

A coder/decoder 21 encodes data to be transmitted and decodes the received data according to a coding standard such modified Hauffman (MH), modified READ (MR), or modified-modified READ (MMR). A modem 22 modulates the data to be transmitted and demodulates the received data and facsimile protocols. A telephone network controller 23 controls the interface between the facsimile machine and the telephone network. A power supply 24 supplies electric power to the electrophotography type print engine.

A temperature detector 25 is connected to the thermistor 16 shown in FIG. 1, and quantizes the output voltage of the thermistor 16 into a temperature data, and sends the temperature data to a later described main controller 26. The main controller 26 controls the overall operation of the facsimile machine under the control of the programs stored in the ROM 19.

Information is transmitted to the receiving end either in a feeder transmission mode or in a memory transmission mode. The feeder transmission mode is a mode where a scanner 18 reads information on the original while sending the information to the receiving end. The memory transmission mode is a mode where the scanner 18 first reads information on the original and stores the information into the RAM 20 and the information is sent to the receiving end after all the information has been stored in the RAM 20.

The main controller 26 activates the transmission operation of the information read from the original either in the feeder transmission mode or in the memory transmission mode. Upon detecting that the printing of the transmission report has been set ON, the main controller 26 starts to carry out a preheat operation. The preheat operation is an operation where the main controller 26 does not send a print initiating command to the print engine but causes the power supply 24 to supply electric power to the heater 15 so as to heat the heat roller 14a to a preheat temperature Tp.

In the feeder transmission mode, the preheat operation is carried out at the same time as the original is read by the scanner 18 and sent to the receiving end. In the memory transmission mode, the preheat operation is carried out at the same time as information stored in the RAM 20 is read and sent to the receiving end.

The preheat operation causes the temperature of the heater 15 to rise without performing a printing operation. Thus, it is desirable to control the temperature of the heat roller 14a to a temperature within a predetermined range so that components such as heat rollers 14 and chassis, not shown, surrounding the heater 15 are not damaged by exceeds heat. For this reason, the main controller 26 monitors the temperature data from the temperature detector 25, thereby shutting down the electric power to the heater 15 if the temperature of the heat roller 14a exceeds the preheat temperature Tp and supplying power to the heater 15 if the temperature decreases below the preheat temperature Tp.

Upon detecting that the information has been sent to the receiving end, the main controller 26 starts to heat the heat roller 14a from the preheat temperature Tp to the fixing temperature Tf higher than the preheat temperature Tp.

Figure 3:
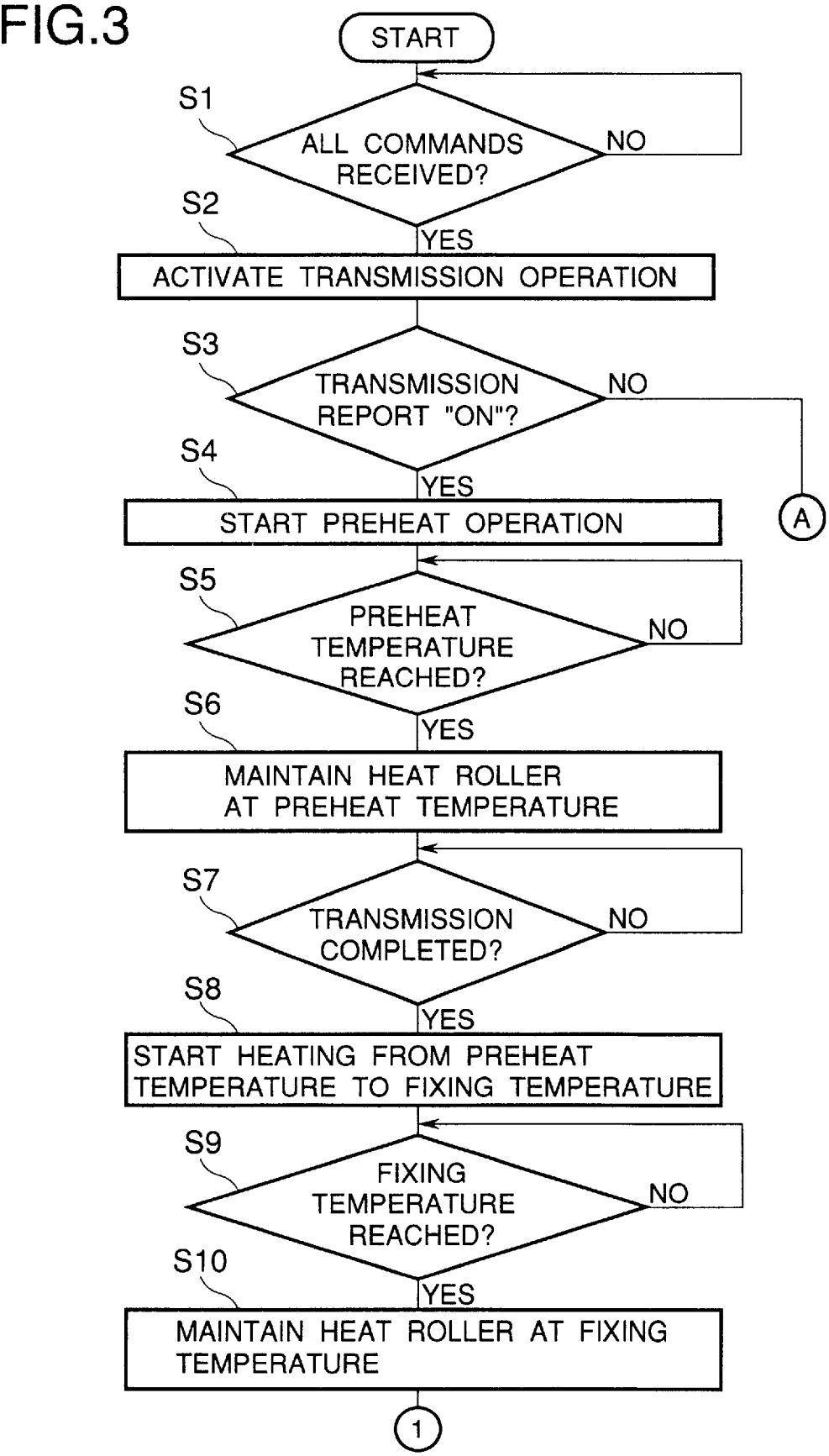
FIGS. 3 and 4 show flowcharts of the operation of the invention.
Figure 4:
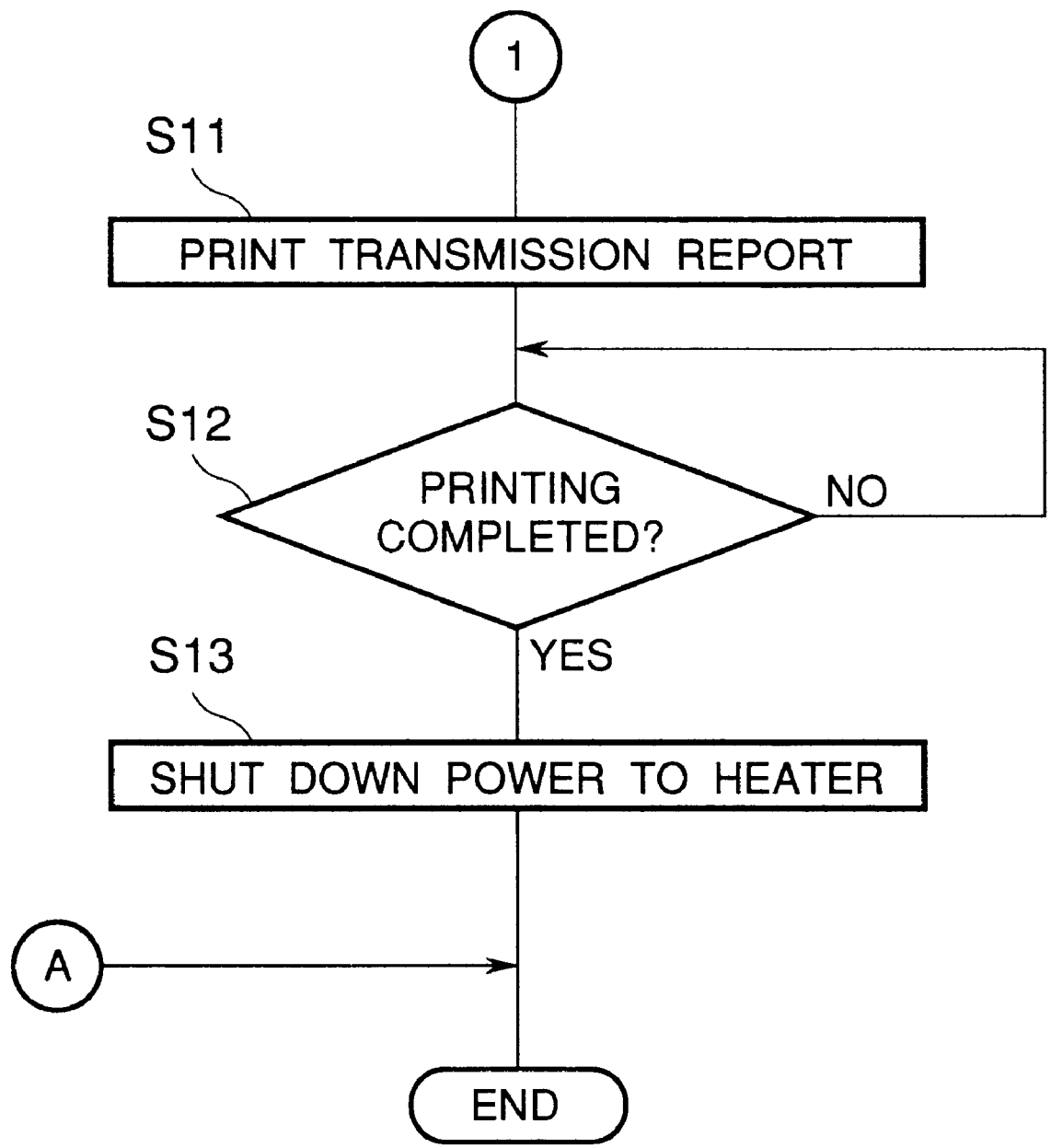

The printing operation of the transmission report of the facsimile machine of the aforementioned construction will be described. FIGS. 3 and 4 show flowcharts illustrating the operation of the facsimile machine in the feeder transmission mode. First, the operation in the feeder transmission mode will be described with reference to FIGS. 3 and 4.

The user places an original on the platform of the facsimile machine and inputs the telephone number of the receiving end. Then, the user inputs a command as to whether the TRANSMISSION REPORT should be printed or not, and then depresses the START switch to activate the transmitting operation. The command as to whether or not the TRANSMISSION REPORT should be printed is stored into the RAM 20.

At step S1, when the main controller 26 receives all the commands input from the operating panel 17. Then, the main controller 26 proceeds to step S2 where the transmitting operation is activated. That is, the main controller 26 performs a calling and sets various protocols for communicating with the receiving end.

At step S3, the main controller 26 checks the content of the RAM 20 for an instruction to print the transmission report. If the instruction is found in the RAM 20, then the main controller 26 starts the preheat operation. Then, the program proceeds to step S4 where the preheat operation is started. If the instruction is not found in the RAM 20, the flowchart is over.

At step S4, the controller 26 causes the power supply 24 to supply electric power to the heater 15 in order to increase the temperature of the heat roller 14a. At step S5, the main controller 26 receives the temperature data from the temperature detector 25 and determines the temperature of the heat roller 14a from the temperature data. Upon detecting that the temperature of the heater 15 has reached the preheat temperature Tp, the program proceeds to step S6 where the main controller 26 controls the electric energy supplied to the heater 15 to maintain the heater at the preheat temperature Tp. In the present invention, the preheat temperature Tp varies from machine to machine.

After having completed at step S1 all the setting-ups necessary for communicating the information between the receiving end, the scanner 18 reads the information on the original and sends the information via the telephone network to the receiving end. In other words, the preheat operation is performed concurrently with the transmission of the information to the receiving end.

At step S7, after detecting that all the information has been sent to the receiving end, the program proceeds to step S8 where the power supply 24 supplies electric power to the heater 15 to start heating the heat roller 14a. The heater 15 remains energized till the heat roller 14a reaches the fixing temperature Tf. When the heat roller 14a has reached the fixing temperature Tf at step S9, the program proceeds to step S10 where the main controller 26 performs the control to maintain the temperature of the heat roller 14a at the fixing temperature Tf.

Then, the program proceeds to step S11 where the main controller 26 reads information for the transmission report from the RAM 20, and sends the information to the print engine 1. The print engine 1 starts to print the transmission report.

The charging roller 8 causes the photoconductive drum 7 to be charged. The head 9 illuminates the charged surface of the photoconductive drum 7 to form an electrophotostatic latent image thereon. The developing roller 11 develops the latent image into a toner image. The toner image is transferred by the transfer roller 12 onto the print medium 5 which is transported by the feed rollers 6.

After transferring the toner image, the print medium 5 is transported further downstream of the medium transporting path till the print medium 5 is pulled in between the heat rollers 14a and 14b.

The heat rollers 14a and 14b apply heat and pressure to the print medium 5 in order to fuse the toner image on the print medium 5. Then, the print medium 5 is ejected.

If it is determined at step S12 that the printing of the transmission report has been completed, then at step S13, the main controller 26 stops supplying electric power to the heater 15, completing the printing operation of the transmission report.

Figure 5:
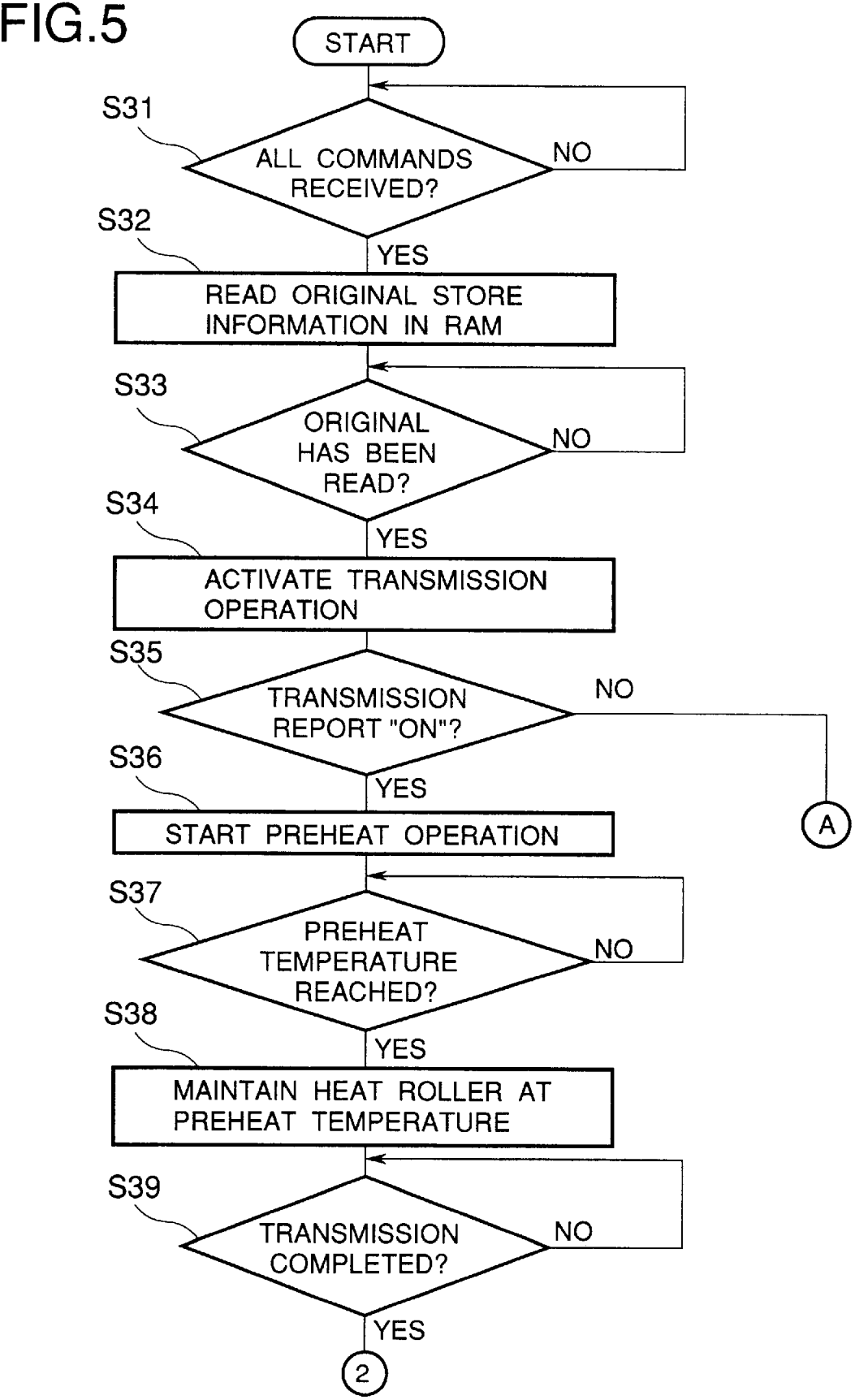
FIGS. 5 and 6 show flowcharts of the operation of the invention.
Figure 6:
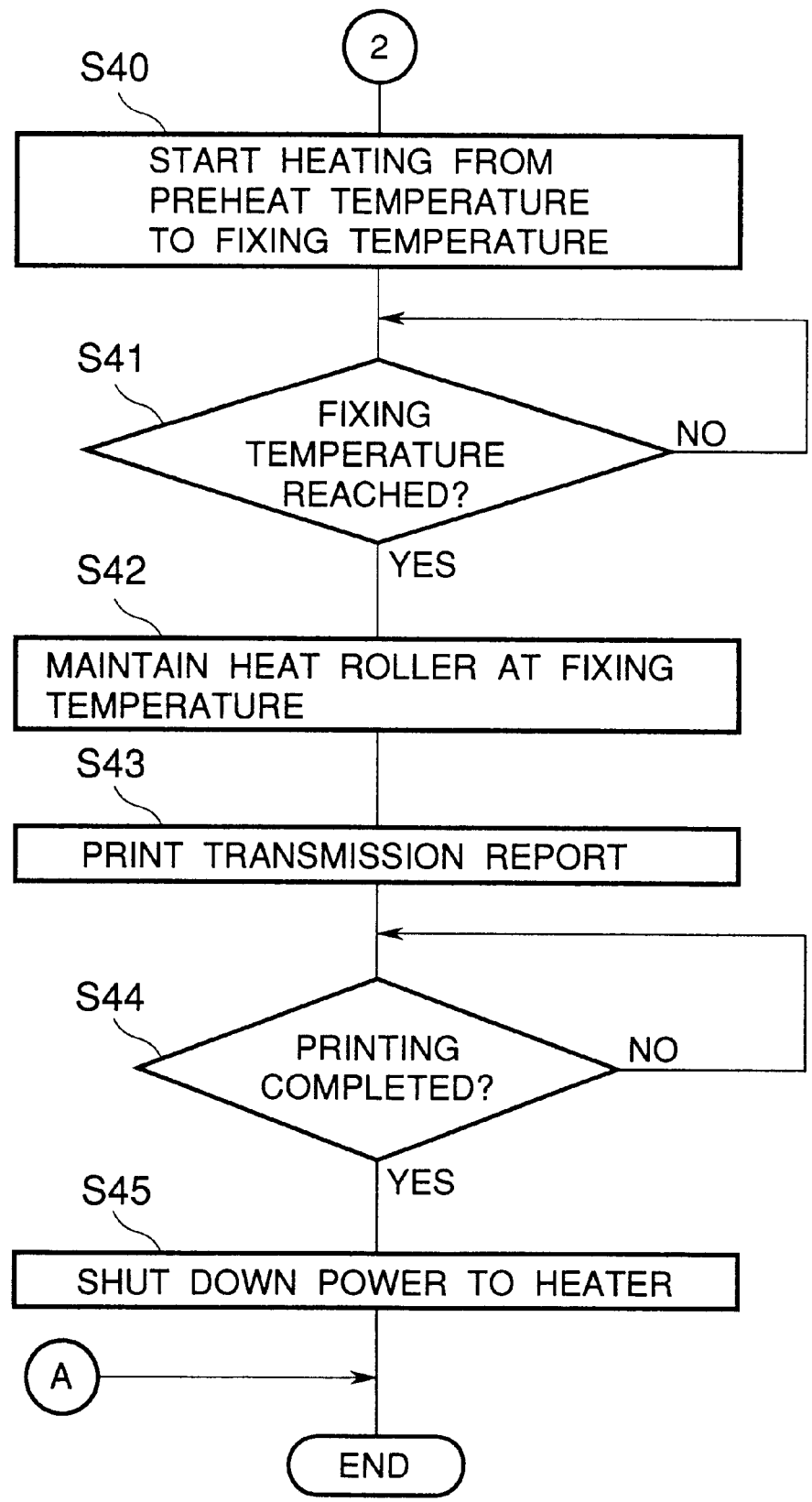

The printing operation of the transmission report in the memory transmission mode will now be described with reference to the flowcharts shown in FIGS. 5 and 6.

The user places an original on the platform of the facsimile machine and inputs the telephone number of the receiving end. Then, the user inputs from the operating panel a command as to whether or not the transmission report should be printed. This command is stored into the RAM 20. Then, the user depresses the START switch to activate an operation for reading information from the original and storing the read information into the RAM 20. At step S31, upon receiving the commands input from the operating panel 17, and at step S32, the scanner 18 reads the information from the original and stores the information into the RAM 20. When the main controller 26 completes the reading of the original at step S33, the program proceeds to step S34 where the transmission is activated. That is, the main controller 26 performs a calling and sets various protocols for communicating the information with the receiving end.

At step S35, the main controller 26 checks the content of the RAM 20 for an instruction to print out the transmission report. If the instruction is found in the RAM 20, the main controller 26 proceeds to step S36 where the preheat operation is started. If the instruction is not found in the RAM 20, the flowchart is over.

After activating the transmitting operation at step S34, the main controller 26 reads the information sequentially that has been stored in the RAM 20 and sends the information via the telephone network to the receiving end. The preheat operation is performed concurrently with the transmission of information to the receiving end.

Steps S36–S45 are exactly the same as steps S4–S13 shown in FIGS. 3 and 4 and the description thereof has been omitted.

FIG. 7 is a sequence chart showing the operation of the facsimile machine of the embodiment.

As shown in FIG. 7, the main controller 26 performs both transmitting operation and the preheat operation at the same time, thereby requiring a shorter time for the heat roller 14a to be heated to the fixing temperature Tf after the transmission operation.

For example, if the fixing temperature Tf is 155° C., the preheat operation allows the heat roller 14a to be heated to a preheat temperature Tp of 135° C. Therefore, it takes a time length tb (only about 3 seconds) for the temperature of the heat roller 14a to rise from 135° C. to 155° C. In other words, the required heat-up time is greatly improved from about 17 seconds in the conventional facsimile machines to about 3 seconds.

The time required for heating the heat roller 14a from the preheat temperature Tp to the fixing temperature Tf depends on ambient temperatures Ta. For example, the required time increases with decreasing ambient temperature Ta. The fixing temperature Tf and preheat temperature Tp may be set to desired values.

The preheat operation is performed only when the TRANSMISSION REPORT is set ON. This is advantageous in saving electric power.

In this embodiment, the time from the activation of the transmitting operation till the transmission report is printed out is shortened by the time required for the temperature of the heat roller to be increased from an ambient temperature Ta to the preheat temperature Tp.

As a result, the transmission report is more quickly available to the user after the transmitting operation.

Some facsimile machines cannot send the next information or receive a call from other facsimile machine until the transmission report has been printed out. The present invention is applicable to such facsimile machines since the preheat operation shortens the time from the completion of the transmission till the next transmission can be started or a call from other facsimile machine can be received.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a temperature of a heat roller for a fixing unit for use in a facsimile machine in which a print engine prints a transmission report after information has been transmitted to a receiving end, the method comprising the steps of:

increasing a temperature of the heat roller to a predetermined temperature concurrently with transmission of information to a receiving end;

maintaining the heat roller at the predetermined temperature during the transmission of the information to the receiving end; and increasing the temperature of the heat roller from the predetermined temperature to a temperature sufficient for fixing, after the transmission of the information has been completed.

2. The method according to claim 1, wherein an electric power is supplied to the heater to increase the temperature of the heat roller to the predetermined temperature when a command to print a transmission report is detected and the transmission of the information is started.

* * * * *